(12) United States Patent
Huber

(10) Patent No.: US 6,318,685 B1
(45) Date of Patent: Nov. 20, 2001

(54) ADHESIVE ELEMENT WITH A SUCTION CUP

(75) Inventor: Beat Huber, Buron (CH)

(73) Assignee: Unilever Patent Holdings B.V., Vlaardingen (NL)

( * ) Notice: Subject to any disclaimer, the term of this patent is extended or adjusted under 35 U.S.C. 154(b) by 0 days.

(21) Appl. No.: 09/367,495

(22) PCT Filed: Feb. 6, 1998

(86) PCT No.: PCT/EP98/00720

§ 371 Date: Nov. 1, 1999

§ 102(e) Date: Nov. 1, 1999

(87) PCT Pub. No.: WO98/36182

PCT Pub. Date: Aug. 20, 1998

(30) Foreign Application Priority Data

Feb. 17, 1997 (CH) .................................................. 0354/97

(51) Int. Cl.[7] .............................. A45D 42/14; F16B 47/00
(52) U.S. Cl. ......................................................... 248/205.5
(58) Field of Search ............................. 248/205.5, 205.6, 248/205.7, 205.8, 206.2

(56) References Cited

U.S. PATENT DOCUMENTS

| 2,144,159 | 1/1939 | Kieft . |
| 4,945,598 | 8/1990 | Racioppi . |
| 5,104,077 | 4/1992 | Liu ..................................... 248/205.8 |
| 5,645,254 | * 7/1997 | Ng et al. ........................... 248/206.2 |

FOREIGN PATENT DOCUMENTS

| 658 104 | 10/1986 | (CH) . |
| 2 253 693 | 5/1974 | (DE) . |
| 35 18640 A1 | 11/1986 | (DE) . |
| 41 36 638 A1 | 5/1992 | (DE) . |
| 0 611 533 | 8/1994 | (EP) . |

* cited by examiner

Primary Examiner—Ramon O. Ramirez
(74) Attorney, Agent, or Firm—Pillsbury Winthrop LLP

(57) ABSTRACT

An adhering element (10) has a sucker (12) made of an elastomeric plastic and a connecting element (14) made of a more rigid plastic. The connecting element (14), which has a flange border (24), is connected non-releasably to the sucker (12) by virtue of the two parts (12), (14) being produced preferably by two-component injection moulding. This increases the stability of the adhering element (10), in particular when the latter is connected to an elongate object, for example a self-supporting toothbrush.

5 Claims, 1 Drawing Sheet

ADHESIVE ELEMENT WITH A SUCTION CUP

This application is the national phase of international application PCT/EP98/00720 filed Feb. 6, 1998 which designated the U.S.

The invention relates to an adhering element with a sucker according to the preamble of claim 1 and to an adhering element connected to an object.

Adhering elements which are provided with a sucker are known in general and, provided, for example with a hook, are used in bathrooms in order to hang objects, for example towels. The hook, which consists of a more rigid material than the sucker, is usually connected to the sucker on the outside of the latter.

In addition, a sucker which is known from EP-A1-0 611 533 and corresponds to the preamble of claim 1 is arranged at the end of a toothbrush handle, in order that said toothbrush can usually be set down vertically on a horizontal surface. The sucker, which consists of an elastomeric plastic, is connected to the toothbrush handle by way of its head side. This sucker may either be produced separately from the handle and connected to the handle by adhesive bonding or a mechanical connection or be produced integrally, by injection moulding, with a non-slip handle sheath.

The disadvantage with this known adhering element on the toothbrush is the high degree of compliance of the sucker, as a result of which the stability is brought into question.

The object of the invention is therefore to provide an adhering element which, without any reduction in adherence, ensures increased stability.

The object set is achieved according to the invention by the features of claim 1 and other claims.

The solution according to the invention results in the sucker being stiffened, so that the possibility of the latter slanting is reduced. This is advantageous, in particular, when an elongate object is fastened perpendicularly, either vertically or horizontally, with respect to a fastening surface.

Further advantages of the invention can be gathered from the following description of an exemplary embodiment.

Figure 2:
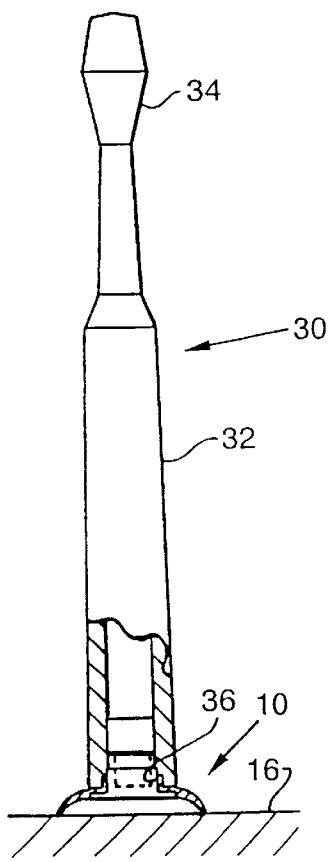
Figure 1:
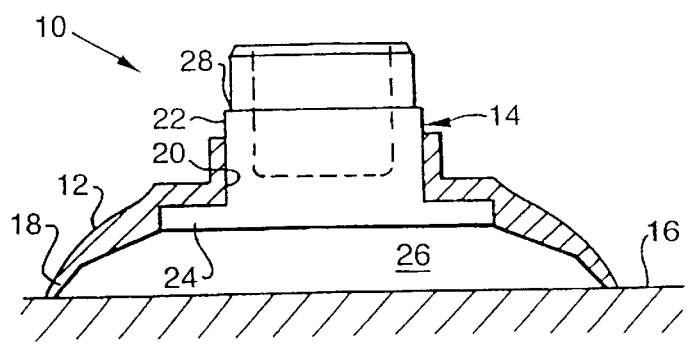

An exemplary embodiment of the invention is explained in more detail with reference to the drawings, in which:

FIG. 1 shows an adhering element with a sucker and a connecting element for fastening an object, and FIG. 2 shows the adhering element according to FIG. 1 with a toothbrush fastened thereon.

The adhering element 10 illustrated in FIG. 1 has a sucker 12 which consists of an elastomeric plastic and a connecting element 14 which is connected to the sucker and consists of a more rigid plastic. The sucker 12 is illustrated in a non-stressed state on its smooth planar surface 16, on which it rests by way of its sealing border 18.

The connecting element 14 has a stub 22 which passes through a passage 20 in the sucker 12 coaxially. The stub 22 has a flange border 24 by way of which it grips behind the sucker 12 in the interior 26 of the latter. The stub 22 projects out on the outside of the sucker 12 in order to be connected to an object which is to be fixed. At the projecting end, the stub 22 has a step 28.

The sucker 12 is connected non-releasably to the connecting element 14 preferably by two-component injection moulding. This ensures that the sucker 12 does not have any unsealed locations which could impair its adherence. However, it is also possible to produce a non-releasable connection by ultrasonic welding, adhesive bonding or welding by the supply of heat.

It is also conceivable for the connecting element to be produced from a material other than plastic, for example from metal. In such a case, it would be possible for the non-releasable connection between the sucker and the connecting element to be produced by adhesive bonding.

The sucker 12 is stabilized by the flange border 24 of the connecting element 14 resting in the interior 26 of the sucker 12. As a result, the stability of the adhering element 10 is increased, on the one hand, and, on the other hand, it is made easier to detach the adhering element 10 from the surface 16 as a result of leverage.

Since the connecting element 14 consists of a more rigid material than the sucker 12, a more solid connection to the object which is to be fixed is also ensured.

In FIG. 2, the adhering element 10 according to FIG. 1 is arranged on a self-supporting toothbrush 30. As its essential elements, said toothbrush has a hollow handle 32 and a brush head 34. For fastening purposes, the projecting end of the stub 22 of the connecting element 14 passes into a passage 36 of the hollow handle 32 of the toothbrush 30.

The toothbrush 30 is preferably connected non-releasably to the adhering element 10 by ultrasonic welding. However, it is also possible for the parts 30 and 10 to be connected to one another by adhesive bonding or the supply of heat. The handle 32 may in this case be connected either to the flexible sucker 12 or to the more rigid connecting element 14. Such a connection makes it possible to prevent the formation of joints in which contaminants can penetrate.

The adhering element according to the invention may also be used, for example, for fixing some other kind of brush or some other kind of object.

What is claimed is:

1. Adhering element for fixing an object (30) on a smooth planar surface (16), with a sucker (12) which comprises an elastomeric plastic and has a sealing border (18), the sucker (12) being connected non-releasably to a connecting element (14) for the attachment of the object (30), the connecting element (14) comprising a material which is more rigid than the plastic of the sucker (12), said connecting element comprising a stub (22) which extends outwardly from the sucker, passes through the sucker (12) coaxially and includes an inner flange border (24), which grips behind the sucker (12) in the interior (26) of the latter, the sucker (12) and connecting element (14) being non-releasably connected to one another by two-component injection moulding or by ultrasonic welding.

2. Adhering element according to claim 1, wherein the connecting element (14) consists of plastic.

3. Adhering element according to claim 1, wherein the connecting element (14) consists of metal.

4. In combination, an adhering element according to claim 1 and a brush (30) having a handle (32) which at one end thereof surrounds the connecting element (14) and is non-releasably connected thereto.

5. The combination of claim 4 wherein the brush is a toothbrush.

* * * * *